United States Patent [19]

Yasaka et al.

[11] 4,246,505
[45] Jan. 20, 1981

[54] ROTOR WITH SALIENT POLES AND SHIELD PLATES BETWEEN THE POLES

[75] Inventors: Yasuhiro Yasaka; Yosio Furukawa, both of Hitachi, Japan

[73] Assignee: Hitachi, Ltd., Japan

[21] Appl. No.: 21,917

[22] Filed: Mar. 19, 1979

[51] Int. Cl.³ .............................................. H02K 1/18
[52] U.S. Cl. ..................................... 310/218; 310/214; 310/262; 310/269
[58] Field of Search ............... 310/261, 262, 269, 214, 310/218

[56] References Cited

U.S. PATENT DOCUMENTS

| 994,303 | 6/1911 | Duvall | 310/269 |
| 996,883 | 7/1911 | Reist | 310/269 X |
| 3,157,806 | 11/1964 | Wiedeman et al. | 310/64 |
| 3,514,647 | 5/1970 | Lipstein | 310/269 X |

FOREIGN PATENT DOCUMENTS 51-58802 of 1976 Japan.

Primary Examiner—Mark O. Budd
Attorney, Agent, or Firm—Craig & Antonelli

[57] ABSTRACT

A rotor for electric rotating machines has a plurality of salient poles arranged at certain intervals with each other along the outer periphery of the rotor rim. Each of the shield plates of the rotor has a plurality of reinforcing ribs arranged between adjacent salient poles and extending along the periphery of the rotor. The eddy currents flowing in the shield plates are reduced, thus reducing the eddy current losses.

9 Claims, 18 Drawing Figures

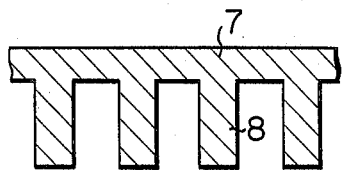
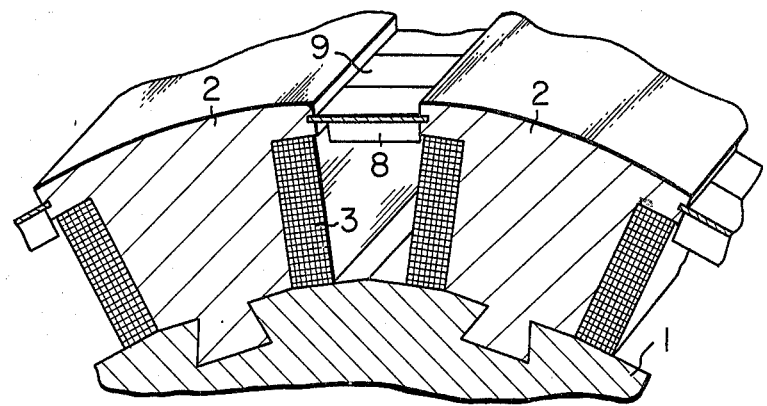
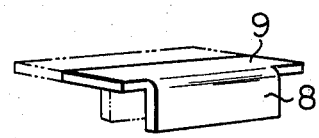
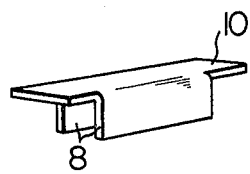 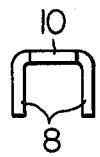 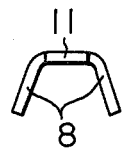 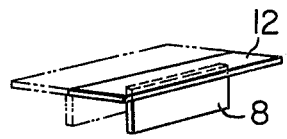
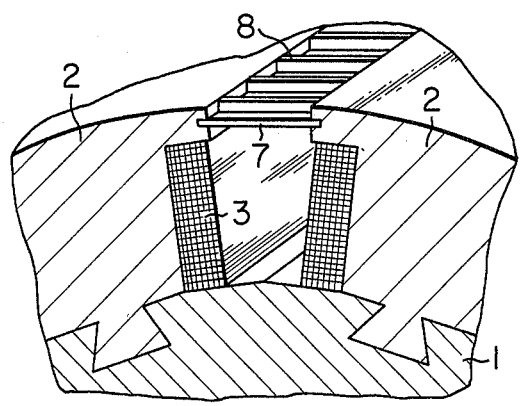

ROTOR WITH SALIENT POLES AND SHIELD PLATES BETWEEN THE POLES

BACKGROUND OF THE INVENTION

1. Field of the Invention

This invention relates to a rotor with salient poles for electric rotating machines such as a hydraulic turbine generator, or more in particular to a construction of the shield plates for sealing the gaps between the poles.

2. Description of the Prior Art

The hydraulic turbine generator has recently increased remarkably both in capacity and speed. This is especially the case with the high head pumping-up power plant. In the hydraulic turbine generator of a high capacity and speed, the peripheral speed of the rotor is high, and the air friction loss thereof is proportional to the cube of the peripheral speed, resulting in an increased power loss and a reduced efficiency. For this reason, attempts have been made to reduce the air friction loss by providing the rotor with a substantially cylindrical surface.

Examples of such attempts are disclosed in Japanese Utility Model Application No. 131642/74 (Laid-open No. 58,802/76) and U.S. Pat. No. 3,157,806. In these prior art machines, as shown in FIG. 1, the rotor comprises a rotor rim 1 fixed on a rotor shaft (not shown), salient poles 2 with field coils 3 mounted to the rotor rim and non-magnetic shield plates 4 each supported between the heads of adjacent poles 2 so that the rotor presents a substantially cylindrical configuration, thereby reducing its air friction loss.

In this construction, however, when the rotor is increased in diameter and speed for increasing its capacity, it naturally results in an increased centrifugal force exerted on the shield plates 4. Therefore, the shield plates 4 are required to be made thicker.

Let the thickness of the seal plate 4 be t, the force exerted on the shield plate 4 be F, and the bending stress acting on the shield plate 4 be $\sigma_b$. Since the modulus of section of the shield plate 4 is proportional to the square of t, $$\sigma_b \propto (F/t^2) \tag{1}$$

While, the mass of the shield plate is proportional to the thickness t, the centrifugal force F is expressed as $$F \propto D\omega^2 t \tag{2}$$

where D is the diameter and $\omega$ the angular velocity of the rotor. From the expressions (1) and (2), $$\sigma_b \propto (D\omega^2/t) \tag{3}$$

When the angular velocity of the rotor is increased, the bending stress $\sigma_b$ is also increased and hence the shield plate must be strengthened so as to be unbroken against the increased bending stress. Since the strength of the material for the shield plate is limited, it is required generally to increase the thickness of the shield plate.

In order to increase the thickness of the shield plate 4, the heads or eaves of the poles 2, where the shield plates are mounted, must be made thicker as shown in FIG. 2. This increases the size of the salient-pole, resulting in increasing the outer diameter and weight of the rotor.

Further, the magnetic lines of force generated by the current flowing in the stator coil 6 inserted into the slots of the stator core 5 are distributed as shown by dotted lines $\Phi$ in FIG. 2. Since the magnetic pole is of a ferromagnetic material, the magnetic lines of force 100 are concentrated at the eaves of the pole 2 and run substantially parallel with the shield plate 4 in the neighbourhood of the eaves. As a result, in the case where the shield plate 4 is thick and made of an electrically conductive metallic sheet as generally used, an eddy current Ie as shown in FIG. 3 flows. This causes not only the shield plates 4 to heat, but also the power loss to increase.

SUMMARY OF THE INVENTION

An object of the present invention is to provide a rotor with salient poles in which the above-mentioned disadvantages of the prior art are eliminated and the thickness of the shield plate is not increased while the bending stress thereof is decreased, thus reducing the outer diameter and weight thereof.

In order to achieve this objective, according to this invention, a comparatively thin shield plate is used which is provided with a plurality of reinforcing ribs extending along the circumference of the rotor and spaced from each other in the axial direction of the rotor.

BRIEF DESCRIPTION OF THE DRAWINGS

FIG. 5 is a sectional view taken along line V—V of FIG. 4.

FIG. 6 is a perspective sectional view showing the essential parts of the rotor with salient poles in another embodiment of the present invention.

FIG. 7 is a perspective view showing an L-shaped shield plate used with the salient-pole rotor shown in FIG. 6.

FIG. 8A and 8B are perspective view and an end view, respectively, of the U-shaped shield plate.

FIG. 9 is an end view of a modification of a U-shaped shield plate.

FIG. 10 is a perspective view showing a T-shaped shield plate.

FIG. 11 is a cut-away perspective view showing the essential parts of a salient-pole rotor in still another embodiment of the present invention.

DESCRIPTION OF THE PREFERRED EMBODIMENTS

Figure 1:
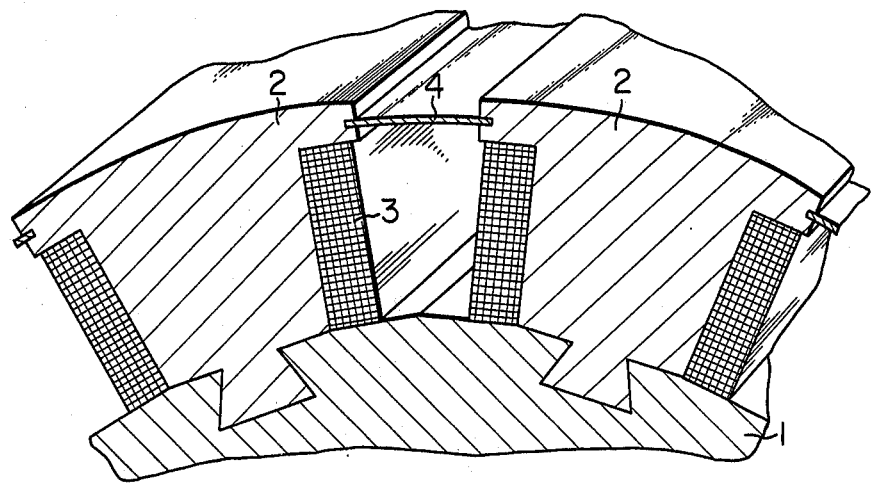
FIG. 1 is a sectional view showing the essential parts of a conventional rotor with salient poles.
Figure 2:
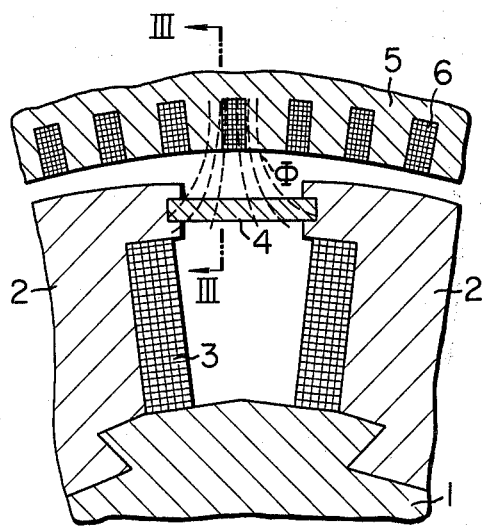
FIG. 2 is a sectional view showing the essential parts of a conventional electric rotating machine with salient poles having thick shield plates.
Figure 3:
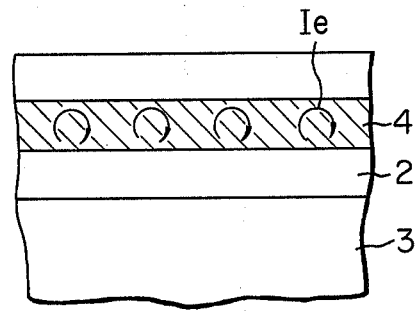
FIG. 3 is a sectional view taken along line III—III in FIG. 2.
Figure 4:
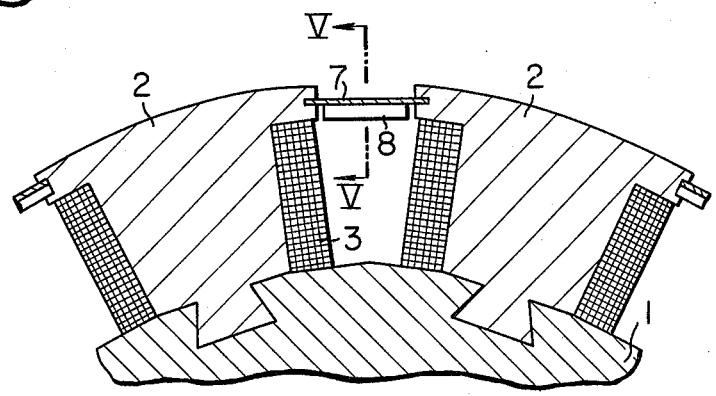
FIG. 4 is a diagram showing the essential parts of the rotor with salient poles in an embodiment of the present invention.

An embodiment of the present invention will be described below with reference to FIGS. 4 and 5. In these figures, those components which are the same as those shown in FIGS. 1 to 3 are given the same reference numerals.

The inner periphery of the shield plate 7, in this embodiment, is formed integrally with a plurality of reinforcing ribs 8 extending along the circumference and spaced from each other in the direction of axis of the rotor.

Thus, without increasing the thickness of the shield plate 7, the bending stress thereof is decreased, thereby eliminating the need for increasing the thickness of the eaves of the field core 2. Also, in the case where the shield plate is made of an electrically conductive metallic sheet, the eddy currents hardly flow because the shield plate is thin and its electrical resistance is high.

Another embodiment of the present invention is shown in FIGS. 6 and 7. In this embodiment, the shield plate having the reinforcing ribs 8 is divided into a plurality of parts along the rotor axis, and each of the divided parts of the shield plate 9 is formed in the shape of L. The other parts of this rotor are substantially the same as those in the embodiment of FIG. 4. The embodiment of FIG. 6 gives not only the same effect as the embodiment of FIG. 4, but also additional effects such as easy mounting and demounting of the shield plates and easy manufacture of the shield plates by using the L-shaped steel available on the market.

In place of the L-shaped plate 9, other configurations such as U-shaped plate 10 as shown in FIGS. 8A and 8B, deformed U-shaped plate 11 as shown in FIG. 9 or T-shaped plate 12 shown in FIG. 10 may be used for the divided parts of the shield plate. The parts having such configurations also can be easily fabricated by using U-shaped or T-shaped steel available on the market.

FIG. 11 shows another embodiment in which the reinforcing ribs 8 are provided to the outside of the shield plate 7. According to this embodiment, the inner side of the shield plate 7 presents a substantially smooth surface, so that smaller resistance is offered to the cooling air flow through the duct between the salient poles in the direction along the rotor axis, thus reducing the loss. Since the protrusions and recesses on the outer periphery formed by the reinforcing ribs 8 extend in the circumferential direction and therefore the air friction loss due to the protrusions and recesses is increased only slightly.

Figure 12:
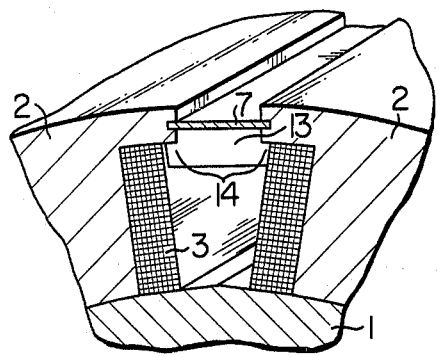
FIGS. 12, 14 and 16 are cut-away perspective views showing the essential parts of the pole rotors in further embodiments of the present invention.
Figure 13:
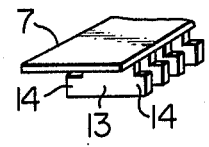
FIGS. 13, 15 and 17 are perspective views of the shield plates with reinforcing ribs used in the rotors of FIGS. 12, 14 and 16, respectively.

Still another embodiment of the present invention is shown in FIGS. 12 and 13. In this embodiment, the reinforcing rib 13 is secured at its one edge integrally by welding or the like to the shield plate 7 and extends partially at both ends thereof in the circumferential direction, thus forming engaging portions 14 which engage with the eaves of the poles 2. In this way, the reinforcing rib 13 serves to support the shield plate 7 against the centrifugal force exerted thereon, so that the thickness of the shield plate 7 can be reduced further.

Figure 14:
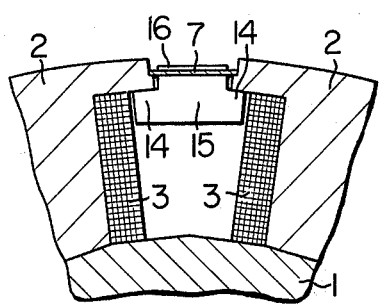
Figure 15:
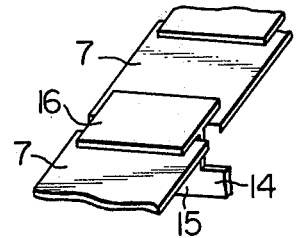

A further modification of the embodiment of FIGS. 12 and 13 is shown in FIGS. 14 and 15. The reinforcing rib 15, in addition to the engaging portions 14, has an integrally-formed support plate 16 extending over the outer surface of the shield plate 7 in the direction along the rotor axis so that the shield plate 7 rested on the step formed in the eaves of the field core 2 is supported by the supporting plate 16.

This construction makes it possible to use the shield plate 7 of an electrically insulating material having low mechanical strength, thus totally eliminating the eddy current which otherwise might flow in the shield plate 7. In other words, the upper portion of the reinforcing and supporting rib 15 and the supporting plate 16 are shorter in the circumferential direction of the rotor than the distance between the eaves of the adjacent poles, so that the distance between supporting points of the shield plate 7 is shortened thereby reducing the bending stress applied thereto. As a result, by using a metal material high in mechanical strength for the reinforcing and supporting rib 15, the shield plate may be made of an electrically insulating material low in mechanical strength, thus eliminating the eddy current loss as mentioned above. In this embodiment, since the shield plate 7 rests on the step of the eaves of the field core 2 is it possible to fit it to the position from the outside of the rotor and then locate the reinforcing rib 15 to support the shield plate. Therefore, the mounting and demounting of the shield plate is facilitated greatly independently of the axial length of the rotor as compared with the case in which the ends of the shield plate are inserted into the slots formed in the eaves of the poles. The shield plate 7 and the reinforcing and supporting rib 15 are fixed by suitable means such as pin or bolt.

Figure 16:
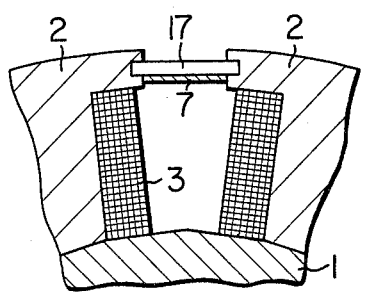
Figure 17:
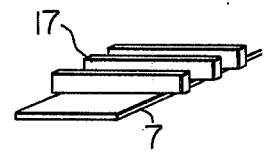

A further embodiment of the present invention is shown in FIGS. 16 and 17. In this embodiment, the ends of the reinforcing and supporting rib 17 are inserted fixedly into the slots formed in the eaves of the poles 2, and the shield plate 7 is provided to the inner side of the reinforcing and supporting ribs 17. This makes it possible to reduce the thickness of the shield plate 7, so that the weight in combination of the shield plate 7 and the reinforcing and supporting rib 17 is smaller than that of the embodiment shown in FIG. 2 where the shield plate itself is thicker. As a result, the force exerted on the slots in the eaves of the poles 2 is reduced, thus leading to the advantages similar to those obtained from the foregoing embodiments.

It will be understood from the foregoing description that according to the present invention a comparatively thin shield plate is used in combination with a plurality of reinforcing ribs extending along the circumference of the rotor and spaced from each other in the direction along the rotor axis. Therefore, since the bending stress applied thereto is reduced, it is possible to make the shield plate thinner, thereby to reduce the outline and weight of the rotor. Further, in the case where the shield plate of metal material is used, the eddy current therein is reduced, thus reducing the eddy current losses.

We claim:

1. A rotor with salient poles for electric rotating machines, comprising a rotor rim, a plurality of salient poles with field coils mounted on said rotor rim, and a plurality of shield plates supported between the heads of adjacent poles and extending substantially along the whole axial length of said poles so that said rotor presents a substantially cylindrical configuration thereby reducing its air friction loss, each of said shield plates being divided into a plurality of parts along the direction of the rotor axis and provided with reinforcing ribs extending along the circumference of the rotor.

2. A rotor with salient poles according to claim 1, in which each part of said divided shield plates is in the shape of L.

3. A rotor with salient poles according to claim 1, in which each part of said divided shield plates is in the shape of U.

4. A rotor with salient poles according to claim 1, in which each part of said divided shield plates is in the shape of T.

5. A rotor with salient poles according to claim 1, in which said reinforcing ribs are provided to the outer side of said shield plates.

6. A rotor with salient poles for electric rotating machines, comprising a rotor rim, a plurality of salient poles with field coils mounted on said rotor rim, and a plurality of shield plates supported between the heads of adjacent poles and extending substantially along the whole axial length of said poles so that said rotor presents a substantially cylindrical configuration thereby reducing its air friction loss, each of said shield plates being divided into a plurality of parts along the direction of the rotor axis and provided with a plurality of reinforcing ribs extending along the circumference of the rotor, each of said reinforcing ribs engaging with the heads of said poles so as to bear at least a part of the centrifugal force exerted on said shield plates.

7. A rotor with salient poles according to claims 1 or 6, wherein each of said shield plates is supported with its circumferential edges fitted into grooves formed in the heads of said adjacent poles.

8. A rotor with salient poles according to claim 7, wherein said adjacent poles are provided with extended step portions, said step portions facilitating the operable engagement of said reinforcing ribs and said circumferential edges with said poles.

9. A rotor with salient poles according to claim 7, wherein supporting plates are operably attached to each of said reinforcing ribs, said supporting plates supporting said shield plates in a radially extending direction from the axis of rotation of said rotor and being provided with a gap between an edge thereof and each of said adjacent poles in a circumferentially extending direction, so as to permit the use of low mechanical strength shield plates constructed of electrical insulating material thereby eliminating eddy current losses in said shield plates.

* * * * *